United States Patent Office 3,108,937
Patented Oct. 29, 1963

3,108,937
COOLANT-MODERATOR CIRCULATION SYSTEM FOR HETEROGENEOUS NUCLEAR REACTORS
Herrmann Kumpf and Robert Weber, Erlangen, Germany, assignors to Siemens-Schuckertwerke Aktiengesellschaft, Berlin-Siemensstadt, Germany, a corporation of Germany
Filed July 10, 1958, Ser. No. 747,759
Claims priority, application Germany July 17, 1957
7 Claims. (Cl. 204—193.2)

Our invention relates to nuclear power plants such as the pressurized water type in which a thermal reactor of the heterogeneous type is cooled and moderated by a circulating liquid which, when leaving the reactor in heated condition, passes through a heat exchanger to impart heat to a secondary conduit system containing the working medium proper of the power plant.

Since the ability of a moderator to slow down the neutrons issuing from the chain-reaction of the nuclear fuel, depends upon the density of the moderator, care must be taken that the coolant used as moderator liquid will enter at lowest feasible temperature into the moderator space of the reactor structure. For that reason, the coolant circulating through such heterogeneous reactors is first passed into the moderator space and thence into the cooling channels for the nuclear fuel elements.

Generally, however, the moderator quantity in nuclear reactors of the type here dealt with amounts to only a fraction, such as approximately one tenth, of the total quantity of liquid to be circulated in the primary circulation system. Consequently, it would not be necessary to pass the entire quantity of coolant through the moderator space. However, a separation into a coolant circulation and a moderator circulation renders the construction of the reactor plant more complicated and more expensive, and makes it impossible to operate with a single circulating system for cleaning purposes.

Referring to nuclear power plants with a heterogeneous reactor operating with coolant-moderator liquid, it is an object of our invention to devise a plant which combines the advantages of both operating methods discussed in the foregoing.

To this end, and in accordance with a feature of our invention, we provide the nuclear reactor of the power plant with a single circulation system for the coolant-moderator liquid and branch from that system a conduit at a point located externally of the reactor and behind the heat exchanger relative to the flow direction; and we connect the external branch conduit with the moderator space of the reactor so as to pass into that space only a fraction of the total quantity of circulating liquid as needed for moderating purposes. We further insert into the branch conduit a device for the further cooling of this fractional quantity of liquid.

The foregoing and other objects and features of our invention will be apparent from the following description of the embodiments of nuclear power plants shown schematically on the drawings, in which—

Figure 1:
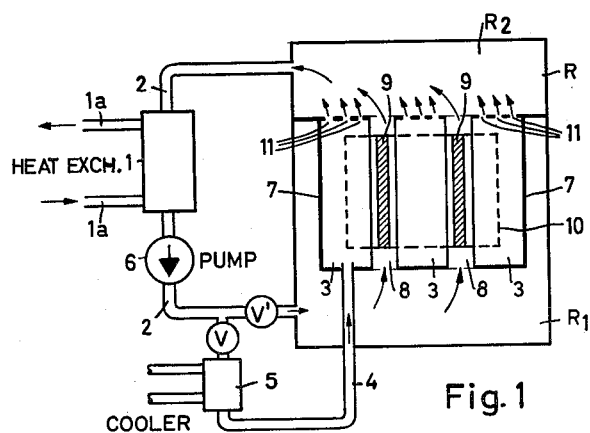
FIG. 1 is the circuit diagram of a nuclear reactor in which the proportion of coolant passing through the moderator space does not participate in cooling the nuclear fuel elements.

According to FIG. 1 the vessel structure R of a power reactor forms an enclosed bottom chamber R1 and an enclosed top chamber R2. The active core of the reactor occupies a central space identified by a broken line and denoted by 10. The core zone is provided with cooling channels 8 in which the fuel elements 9, consisting for example of rods of uranium dioxide, are located. The fuel elements are inserted or replenished from the top, and the spent fuel elements are discharged through the bottom as generally known for reactors of this type. The core zone proper is located within a structure 7 which forms a moderator space 3 around the core zone and is thermally insulated from the surrounding space within the reactor structure R. Although only two cooling channels 8 for reception of fuel elements 9 are shown, it will be understood that a large number of such vertical channels are provided in the usual manner.

The top and bottom chambers R2 and R1 of the reactor communicate with each other through the interspaces between the fuel elements 9 and the walls of the cooling channels 8. A conduit 2 interconnects the chambers R2 and R1 and forms a circulatory system together therewith. This system has an external portion which includes a heat exchanger 1 for transferring heat from the coolant-moderator liquid in conduit 2 to a secondary conduit system 1a traversed by the working medium of the power plant such as water. The coolant-moderator liquid for use with the above-mentioned uranium dioxide elements may consist of heavy water.

A conduit 4 is branched off the primary circulation system at a point located between the heat exchanger 1 and the reactor bottom chamber R1. The branch conduit 4 is traversed only by the fraction of the quantity of liquid required for modulating purposes. This relatively small quantity of liquid is subjected to further cooling in a device 5 which may consist preferably of another fluid-cooled heat exchanger similar to 1 or any other equipment suitable for cooling purposes. A pump 6 located in the primary circulation system behind the heat exchanger 1, seen in the flow direction of the liquid, serves as an impeller for the main or major quantity of liquid as well as for the branched-off minor quantity.

Referring to the above-mentioned use of uranium dioxide as nuclear fuel with heavy water as coolant and moderator, a total circulation of 8000 cubic meters of liquid per hour through the reactor, for example, would require only about 800 cubic meters per hour to pass through the branch conduit 4, it being understood that these numerical values are presented only as an example for generally illustrating the relative order of quantities in the main portion and the branched-off portion of the circulatory system.

During operation of the reactor plant, coolant and moderator flow independently of each other through the cooling channels 8 and through the moderator space 3 respectively. The moderator passes through openings 11 out of the top of the moderator space and then merges in chamber R2 with the coolant flowing from channels 8 through conduit 2 to the heat exchanger 1. After both quantities of liquid have transferred their thermal energy to the secondary working medium flowing in system 1a, the coolant again enters into the reaction zone, whereas the proportion required for moderating purposes first passes from conduit 2 through a valve V into the device 5 for further cooling. This improves the thermal economy of the plant, aside from the simiplified construction, in comparison with an operation comprising entirely separate circulation systems for coolant and moderator respectively. Such improvement is due to the fact that in a circulation system according to the invention—in contrast to separate circulatory systems—the utilizable temperature differences of coolant and moderator merge with each other. The entire temperature range, therefore, can be much more favorably utilized economically than is possible with separate circulations, particularly because the starting temperature of the moderator is at a relatively high level.

Figure 2:
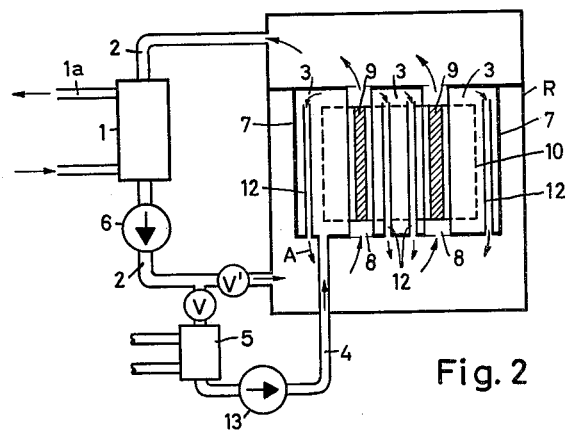
FIG. 2 shows a similar nuclear reactor modified so that the moderator quantity of liquid also participates in cooling the nuclear fuel elements.

The nuclear plant illustrated in FIG. 2 is to some extent similar to that described above with reference to FIG. 1, as is apparent from the use of the same reference characters in both illustrations for denoting respectively similar components. According to FIG. 2, however, the branched-off quantity of liquid serving as a moderator also participates in the cooling of the nuclear fuel elements. For this purpose, the moderator space 3 is provided with built in tubular structures 12 which guide the moderator liquid, after being heated in the moderator space, back to the bottom chamber R1 of the reactor where this portion of liquid joins the main flow of coolant passing from the conduit system 2 into the fuel channels 8. The flow of heated moderator liquid from moderator space 3 through tubes 12 is denoted by arrows such as those shown at A. This plant requires an additional pump 13 in the branch conduit 4, but affords a still more favorable utilization of the heat content of the entire quantity of liquid.

Figure 7:
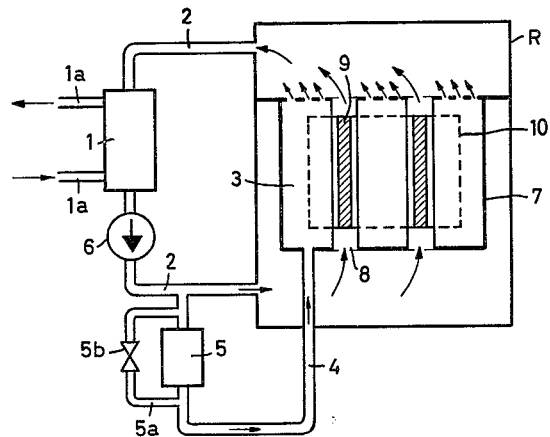
FIG. 7 shows a modification of a reactor plant generally similar to that of FIG. 1.

By connecting a bypass conduit with a throttle and check valve across the cooler 5, the plant can be controled by varying the temperature of the moderator liquid for trimining or calibrating purposes. This is shown in FIG. 7 where a bypass conduit 5a across cooling device 5 includes a throttle and check valve 5b, the plant being otherwise similar to the one described above with reference to FIG. 1. The same effect of varying or controlling the moderator liquid can be obtained in a system as shown in FIG. 1 or FIG. 2 by controlling or varying the quantity of liquid passing through the cooling device 5.

Referring to a plant of the type shown in FIG. 2, the supply of moderator liquid to the cooling channels may be given a variety of designs. For example, the above-mentioned additional pump 13 can be obviated by giving the supply passages for the moderator liquid, at the point where the liquid enters into the cooling channels, one of the designs exemplified by FIGS. 3 to 6. Each of these figures represents an individual cooling channel 8 charged with a fuel element 9.

Figure 3:
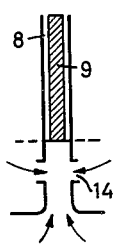
FIGS. 3 to 6 illustrate schematically and in cross section four different embodiments of devices for passing liquid from the moderator space into the fuel-cooling channels for use in a reactor otherwise as shown in the other illustrations.
Figure 4:
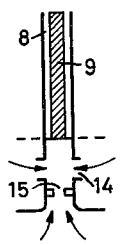
Figure 6:
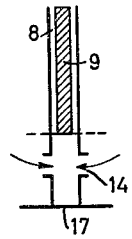
Figure 8:
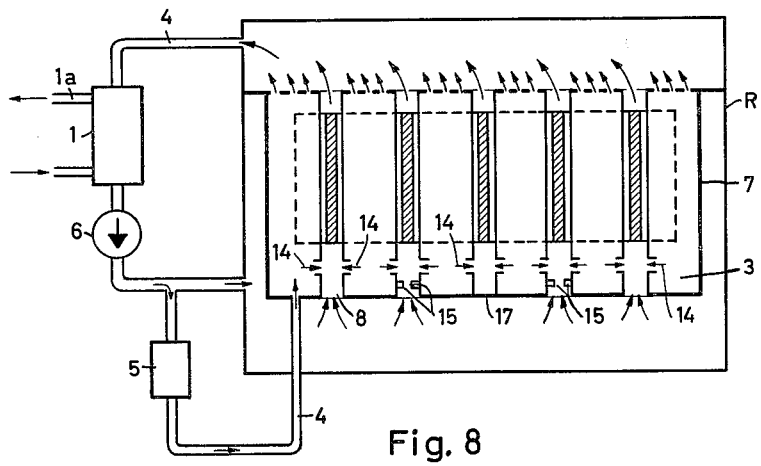
FIG. 8 shows another reactor plant equipped with cooling channel structures as shown in FIGS. 3, 4 and 6.

According to FIG. 3, the cooling channel possesses lateral openings 14 at its lower end, near the bottom of the moderator space 3 as is apparent from FIG. 8 where fuel channels designed according to FIGS. 3, 4 and 6 are provided in the reactor of a plant otherwise corresponding to the one described with reference to FIG. 1. Some of the moderator liquid passing from cooling device 5 through condiut 4 into the moderator space 3 can enter through the openings 14 into the channels 8. Such passage of moderator liquid into the cooling channels is effected by the drop in static pressure of the cooling liquid occurring after the liquid enters into the cooling channel.

The just-mentioned passage of moderator liquid through openings 14 can be promoted by inserting a throttle member 15, such as an apertured diaphragm, at the proper location into the flow path of the cooling liquid, as is shown in FIG. 4.

Figure 5:
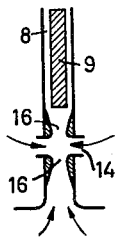

A modified form of such a throttling device is illustrated in FIG. 5. The cooling channel 8 is provided with a Venturi tube structure 16 for locally reducing the liquid pressure and subsequently restoring the flow energy.

According to a further design, illustrated in FIG. 6, those cooling channels 8 that are located in the center zone of the active reactor core, as distinguished from those at the periphery of the core, are entirely closed at the bottom and are provided exclusively with cooled moderator liquid through the passages 14.

The system of cooling channels in the reactor core may also be designed by simultaneously using a plurality of the designs illustrated in FIGS. 3 to 6. For example, the outer zone of the cooling-channel system may be provided with cooling channels according to FIG. 4 or 5, whereas the next inner zone is provided with cooling tubes according to FIG. 3 and the innermost zone with cooling tubes according to FIG. 6. Such a reactor design being exemplified in FIG. 8.

It will be apparent to those skilled in the art, upon studying this disclosure, that the invention permits of various modifications as regards the design and interconnection of the plant components and may be embodied in devices other than those particularly illustrated and described herein, without departing from the essential features of our invention and within the scope of the claims annexed hereto.

We claim:

1. A pressurized liquid type heterogeneous nuclear reactor having a reactor vessel, an enclosure disposed within said vessel and dividing the interior of said vessel into a top chamber and a bottom chamber, channel structures having respective fuel-receiving cooling channels vertically traversing said enclosure between said two chambers and forming together a core zone within said enclosure, said core zone and said enclosure forming together an interstitial moderator space surrounding said core zone, in combination with a closed primary, forced circulation system for coolant-moderator liquid, said system including said cooling channels and having a portion extending externally of said vessel from said top chamber to said bottom chamber, a secondary conduit system for working medium, having a flow path distinct from said primary system, a heat exchanger in said external portion of said primary system for transferring heat to said working medium, conduit means branching off said external portion of said primary system at a point located behind said heat exchanger relative to the flow direction of said coolant-moderator liquid in said primary system and communicating with said moderator space at the bottom thereof for supplying said space from said primary system with a minor portion of said liquid as required for moderating purposes, said enclosure having top openings through which said moderator space communicates with said top chamber so that said minor portion of moderator liquid merges in said top chamber with the coolant-moderator liquid passing through said channels and returns into said primary system without participating in the cooling of the fuel in said channels, and a cooling device inserted in said conduit means for reducing the temperature of said minor portion of liquid.

2. A heterogeneous pressurized liquid type nuclear reactor having a reactor vessel, an enclosure disposed within said vessel and dividing the interior of said vessel into a top chamber and a bottom chamber, channel structures having respective fuel-receiving cooling channels vertically traversing said enclosure between said two chambers and forming together a core zone within said enclosure, said core zone and said enclosure forming together an interstitial moderator space surrounding said core zone, in combination with a closed primary, forced circulation system for coolant-moderator liquid, said system including said cooling channels and having a portion extending externally of said vessel from said top chamber to said bottom chamber, a secondary conduit system for working medium, having a flow path distinct from said primary system, a heat exchanger in said external portion of said primary system for transferring heat to said working medium, conduit means branching off said external portion of said primary system at a point located behind said heat exchanger relative to the flow direction of said coolant-moderator liquid and communicating with said moderator space at the bottom thereof for supplying said space from said primary system with a minor portion of said coolant-moderator liquid as required for moderating purposes, tubular structures mounted within said moderator space and forming a communication between the top portion of said moderator space and said bottom chamber whereby said minor portion of moderator liquid passes from said moderator space back into said primary system and merges in said bottom chamber with the liquid passing into said cooling channels.

3. In a nuclear reactor system according to claim 1, said channel structures comprising flow-throttling means located near the bottom end of said cooling channels in the flow path of the cooling liquid entering from said bottom chamber into said channels, and said channel structures having lateral openings above and in the active range of said throttling means but beneath said core zone, said openings forming a communication between said cooling channels and said moderator space, whereby moderator liquid passes from said moderator space into said cooling channels.

4. In a nuclear reactor system according to claim 1, the cooling channels located centrally of said core zone having flow impeding means located at the bottom end of said channels for substantially preventing the flow of cooling liquid from said bottom chamber into said central channels, and said central channels having openings located beneath said core zone and forming a communication between said cooling channels and said moderator space, whereby moderator liquid passes from said moderator space into said cooling channels.

5. In a nuclear reactor system according to claim 1, wherein only the outer ones of said cooling channels communicate with said bottom chamber whereas the centrally located cooling channels are closed at the respective bottom ends against said bottom chamber and have openings through which said bottom ends communicate with said moderator space, whereby said centrally located channels receive liquid only from said moderator space.

6. In a nuclear reactor system according to claim 1, wherein said cooling channels communicate at their bottom ends with said bottom chamber to a degree increasing from the centrally located channels toward the periphery of said core zone, said cooling channels having openings through which said channels communicate with said moderator space near said bottom ends of said channels, whereby said centrally located channels predominantly receive liquid from said moderator space and the other channels receive graduated smaller amounts respectively of liquid from said moderator space.

7. In combination with a pressurized liquid type heterogeneous nuclear reactor having fuel-receiving cooling channels which jointly define a core zone and having an enclosed moderator space surrounding said core zone, the combination of a closed primary circulation system for pressurized coolant-moderator liquid, said system including said cooling channels and having a portion external of said reactor, a secondary conduit system having a flow path distinct from said primary system, a heat exchanger in said external portion of said primary system for transferring heat from coolant-moderator liquid to said working medium, conduit means branching off said external portion of said primary system at a point located behind said heat exchanger relative to the flow direction of said coolant-moderator liquid in said primary system and communicating with said moderator space for supplying said space from said primary system with a minor portion of said coolant-moderator liquid as required for moderating purposes, and a cooling device inserted in said conduit means for reducing the temperature of said minor portion of liquid, whereby the total quantity of said coolant-moderator liquid entering the reactor, including said minor portion, passes out of the reactor in heated condition, said cooling channels having openings near the liquid entrance of said channels and communicating through said openings with said moderator space, whereby moderator liquid passes from said moderator space into said cooling channels.

References Cited in the file of this patent

UNITED STATES PATENTS

| | | |
|---|---|---|
| 2,297,768 | Hutchings | Oct. 6, 1942 |
| 2,778,792 | Szilard | Jan. 22, 1957 |
| 2,782,158 | Wheeler | Feb. 19, 1957 |
| 2,823,523 | Eakin et al. | Feb. 18, 1958 |
| 2,917,444 | Dreffin | Dec. 15, 1959 |

FOREIGN PATENTS

| | | |
|---|---|---|
| 1,136,490 | France | Dec. 29, 1956 |
| 1,163,654 | France | Apr. 28, 1958 |

OTHER REFERENCES

Glasstone: Principles of Nuclear Reactor Engineering, Van Nostrand Co. (1955), pp. 810–812, 816–819.

Iskenderian et al. and Simpson et al.: International Conference on the Peaceful Uses of Atomic Energy, vol. 3, pp. 157–161 and 212, August 1955, U.N. publication, N.Y.